US012558860B2

(12) United States Patent
Takanashi

(10) Patent No.: US 12,558,860 B2
(45) Date of Patent: Feb. 24, 2026

(54) TIRE MANUFACTURING METHOD AND MANUFACTURING SYSTEM

(71) Applicant: THE YOKOHAMA RUBBER CO., LTD., Kanagawa (JP)

(72) Inventor: Yuta Takanashi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/851,472

(22) PCT Filed: Dec. 12, 2022

(86) PCT No.: PCT/JP2022/045639
§ 371 (c)(1),
(2) Date: Sep. 26, 2024

(87) PCT Pub. No.: WO2023/188565
PCT Pub. Date: Oct. 5, 2023

(65) Prior Publication Data
US 2025/0108577 A1 Apr. 3, 2025

(30) Foreign Application Priority Data

Apr. 1, 2022 (JP) ................................. 2022-061795

(51) Int. Cl.
*B29D 30/08* (2006.01)
*B29D 30/06* (2006.01)
(52) U.S. Cl.
CPC ......... *B29D 30/08* (2013.01); *B29D 30/0601* (2013.01)
(58) Field of Classification Search
None
See application file for complete search history.

(56) References Cited

U.S. PATENT DOCUMENTS

| 10,759,129 | B2 * | 9/2020 | Mariani | ............... | B29D 30/005 |
| 2010/0032864 | A1 | 2/2010 | Marchini et al. | | |
| 2015/0246495 | A1 * | 9/2015 | Onimatsu | .............. | B29D 30/10 264/259 |
| 2017/0190128 | A1 | 7/2017 | Sangiovanni et al. | | |
| 2017/0368778 | A1 * | 12/2017 | Marchini | ............... | B29D 30/36 |

FOREIGN PATENT DOCUMENTS

| JP | 2003-515474 T | 5/2003 |
| JP | 2012-512072 A | 5/2012 |
| JP | 2015-536259 A | 12/2015 |
| JP | 2017-533836 A | 11/2017 |

* cited by examiner

*Primary Examiner* — Jacob T Minskey
*Assistant Examiner* — Adrien J Bernard
(74) *Attorney, Agent, or Firm* — Thorpe North & Western

(57) ABSTRACT

Provided are a method of manufacturing a tire and a system for manufacturing a tire. A plurality of forming drum bodies are allowed to be temporarily placed on a placement device between work stations adjacent to each other, and at least three of the work stations adjacent to each other are provided in the forming step. In accordance with a specification of a green tire, a plurality of the work stations necessary are selected, and a movement path of the forming drum body is determined. A robot arm disposed at a position corresponding to the movement path is used, the placement device disposed at a position corresponding to the movement path is utilized to deliver the forming drum body, thereby the forming drum body is moved along the movement path, and a forming work is performed in each of the selected work stations to form the green tire.

10 Claims, 11 Drawing Sheets

TIRE MANUFACTURING METHOD AND MANUFACTURING SYSTEM

TECHNICAL FIELD

The present technology relates to a method of manufacturing a tire and a system for manufacturing a tire and more particularly to a method of manufacturing a tire and a system for manufacturing a tire capable of manufacturing tires having various specifications with high productivity by sequentially moving a forming drum body to necessary work stations using a robot arm and performing a forming work to form a green tire.

BACKGROUND ART

A known method includes, in forming a green tire, sequentially moving an annular support body (forming drum body) to a plurality of work stations and bonding a tire component to the annular support body in each of the work stations (see, for example, Japan Unexamined Patent Publication No. 2003-515474 T). A robot arm is used to move the annular support body to the next work station, and a holding station is installed between adjacent work stations. A robot arm disposed in the first work station places the annular support body on the holding station installed between the first work station and the second work station. A robot arm disposed in the second work station picks up the annular support body placed on the holding station and moves the annular support body to the second work station. A green tire is formed by sequentially moving the annular support body to the adjacent work stations via the intervening holding station in this way.

In the tire manufacturing plant proposed in Japan Unexamined Patent Publication No. 2003-515474 T, the robot arm has not only a function of moving the annular support body but also a function of rotationally driving the annular support body around its own axis in bonding the tire component and is also used for a forming work of a green tire. The robot arm can bring the annular support body into any desired state with respect to the tire component to be bonded. Therefore, the tire manufacturing plant is advantageous in efficiently forming green tires having various specifications without installing a device for moving the annular support body to a desired position and rotationally driving the annular support body in each of the work stations.

However, in the tire manufacturing plant, in order to move the annular support body from the previous work station to the next work station, it is necessary to pass through a single holding station disposed between the work stations. Along with this, a conveyance path along which the annular support body is moved becomes rigid, which is an obstacle to the flexible and efficient sequential movement of the annular support body to the required work stations.

SUMMARY

The present technology provides a method of manufacturing a tire and a system for manufacturing a tire capable of forming a green tire by sequentially moving a forming drum body to necessary work stations flexibly and smoothly by using a robot arm and capable of manufacturing tires having various specifications with high productivity.

A method of manufacturing a tire according to an embodiment of the present technology includes: sequentially moving a forming drum body to a plurality of work stations in a forming step; forming a green tire by performing a forming work of bonding a tire component to the forming drum body by using a robot arm installed in each of the work stations, and vulcanizing the green tire. The method further includes: allowing a plurality of the forming drum bodies to be temporarily placed on a placement device between the work stations adjacent to each other and providing at least three of the work stations adjacent to each other in the forming step; selecting, in accordance with a specification of the green tire to be formed, a plurality of the work stations necessary for the forming work from all the work stations and determining a movement path of the forming drum body in the forming step; and using the robot arm disposed at a position corresponding to the movement path determined and utilizing the placement device disposed at a position corresponding to the movement path to deliver the forming drum body, thereby moving the forming drum body along the movement path; and performing the forming work in each of the work stations selected.

A system for manufacturing a tire according to an embodiment of the present technology includes: a plurality of work stations formed in a forming step; a forming drum body configured to sequentially move to the work stations; a robot arm installed in each of the work stations; and a vulcanization device and has a configuration in which a green tire is formed by performing a forming work of bonding a tire component to the forming drum body by using the robot arm installed in each of the work stations and in which the green tire is vulcanized by the vulcanization device. The system further includes: a placement device installed between the work stations adjacent to each other; and a control device configured to control each of the robot arms. A plurality of the forming drum bodies are allowed to be temporarily placed between the work stations adjacent to each other, and at least three of the work stations adjacent to each other are provided in the forming step. In accordance with a specification of the green tire to be formed, a plurality of the work stations necessary for the forming work is selected from all the work stations by the control device, and a movement path of the forming drum body in the forming step is determined by the control device. The robot arm disposed at a position corresponding to the movement path determined is controlled by the control device, the placement device disposed at a position corresponding to the movement path is utilized to deliver the forming drum body, thereby the forming drum body is moved along the movement path, and the forming work is performed in each of the selected work stations.

According to an embodiment of the present technology, in the forming step, a plurality of the forming drum bodies can be temporarily placed on the placement device between the adjacent work stations, and there are at least three work stations adjacent to each other. Since the placement device has a function of temporarily placing the forming drum body and a function as a branch point of the movement path of the forming drum body, it is possible to set more various movement paths in accordance with the specification of the green tire to be formed. Thereby, the green tires can be formed by moving the forming drum bodies to the necessary work station in sequence more flexibly and smoothly. By performing the forming work and moving the forming drum body by using the robot arm, green tires having various specifications can be formed efficiently and easily. As a result, it is advantageous in manufacturing tires having various specifications with high productivity.

DETAILED DESCRIPTION

A method of manufacturing a tire and a system for manufacturing a tire according to an embodiment of the present technology will be described below with reference to the drawings.

Figure 1:
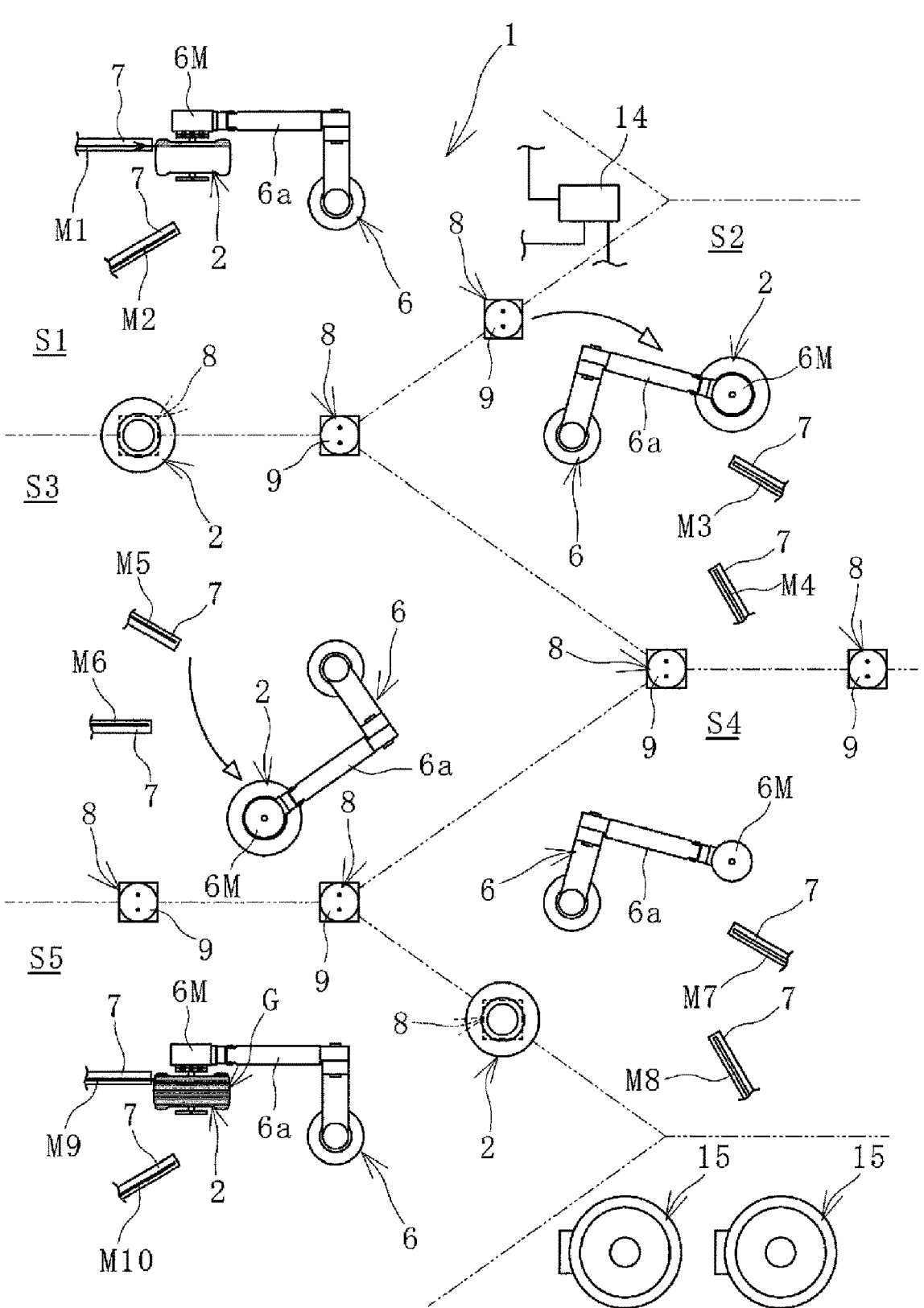
FIG. 1 is an explanatory diagram illustrating equipment constituting an embodiment of a system for manufacturing a tire in a plan view.
Figure 2:
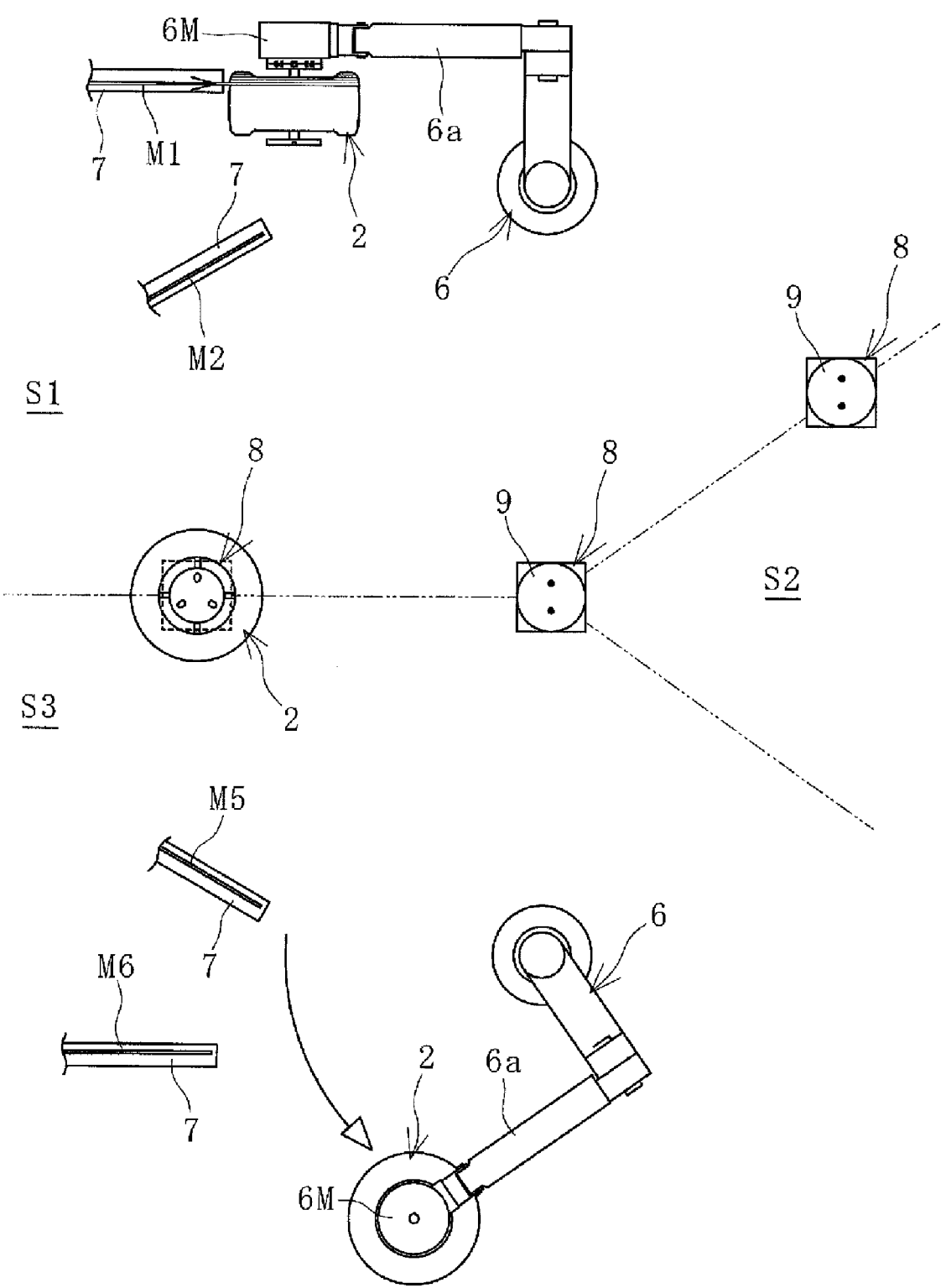
FIG. 2 is an enlarged explanatory diagram illustrating a part of the equipment of FIG. 1.

An embodiment of a manufacturing system 1 for a tire illustrated in FIGS. 1 and 2 includes a plurality of work stations S (S1 to S5) formed in a forming step and a vulcanization device 15 disposed in a vulcanization step. In the forming step, a green tire G is formed, and the formed green tire G is vulcanized by the vulcanization device 15 to manufacture a tire T. The manufacturing system 1 further includes a forming drum body 2, a robot arm 6, a placement device 8, and a control device 14. The control device 14 controls each robot arm 6 so that the forming drum body 2 is sequentially moved to the necessary work stations S using the robot arm 6.

In the drawing, each of the work stations S is shown by being partitioned by a two-dot chain line. In this embodiment, five work stations S1 to S5 are formed in the forming step, but the number of work stations S is not particularly limited, and necessary work stations S are provided in accordance with tire specifications and the like. One or a plurality of robot arms 6 are installed in each of the work stations S.

At least three work stations S adjacent to each other are provided in the forming step. In this embodiment, the three work stations S1, S2, and S3 are adjacent to each other. In addition, the three work stations S2, S3, and S4 are also adjacent to each other, and the three work stations S3, S4, and S5 are also adjacent to each other. That is, in this embodiment, the five work stations are formed in the forming step, and there are three sets of three work stations S adjacent to each other. In the forming step, one set of at least three work stations S adjacent to each other is sufficient, and a plurality of sets of work stations S are more preferably present. Note that as the at least three work stations S adjacent to each other, for example, three to five work stations S adjacent to each other are adopted, and the number of work stations S that can be adjacent to each other is limited by the number of work stations S formed in the forming step.

In each of the work stations S, a forming work of bonding a tire component M to the forming drum body 2 is performed using the robot arm 6 installed in the work station S. Therefore, each of the work stations S is provided with a member supplier 7 for supplying the tire component M to be used for the forming work.

The member supplier 7 supplies any one or more types of the tire components M (M1 to M10) to the forming drum body 2. The various known member suppliers 7 can be used. Examples of the type of the tire component M include an inner liner, a carcass layer, a side rubber, a reinforcing layer, and a tread rubber. The number of the member suppliers 7 disposed in each of the work stations S is set as necessary, and may be singular or plural. Each of the work stations S may be provided with only one member supplier 7 or a plurality of member suppliers 7 for supplying the same kind of tire component M.

The forming drum body 2 functions as a core material at the time of forming the green tire G because various tire components M are bonded and layered. As the forming drum body 2, for example, various known rigid cores can be used. In this embodiment, a rigid core having an outer peripheral surface with the same profile as an inner surface of the tire T to be manufactured is used as the forming drum body 2.

Figure 3:
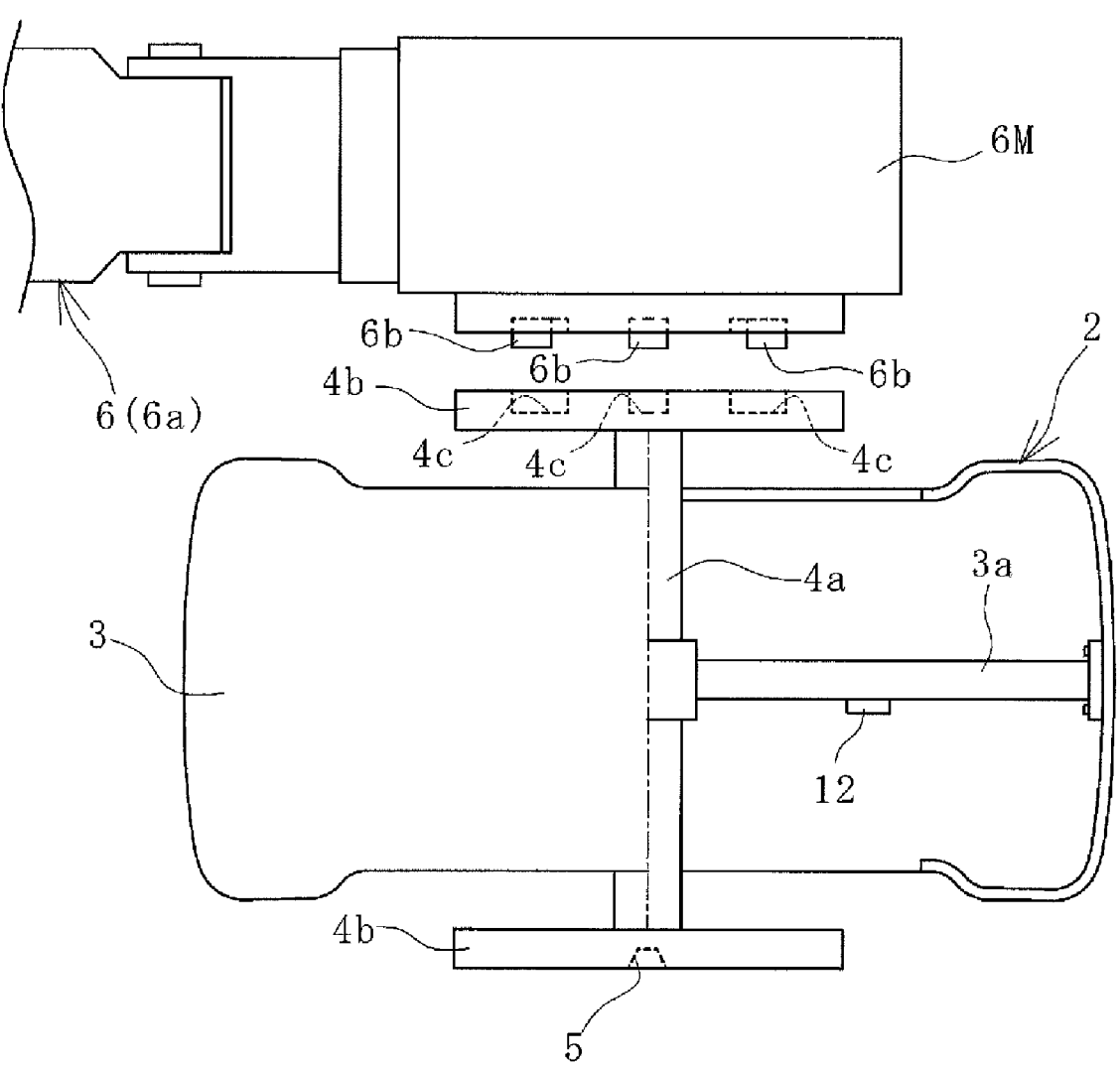
FIG. 3 is an explanatory diagram illustrating a state in which a gripping claw of a robot arm is positioned above a connecting portion of a forming drum body in a side view.
Figure 4:
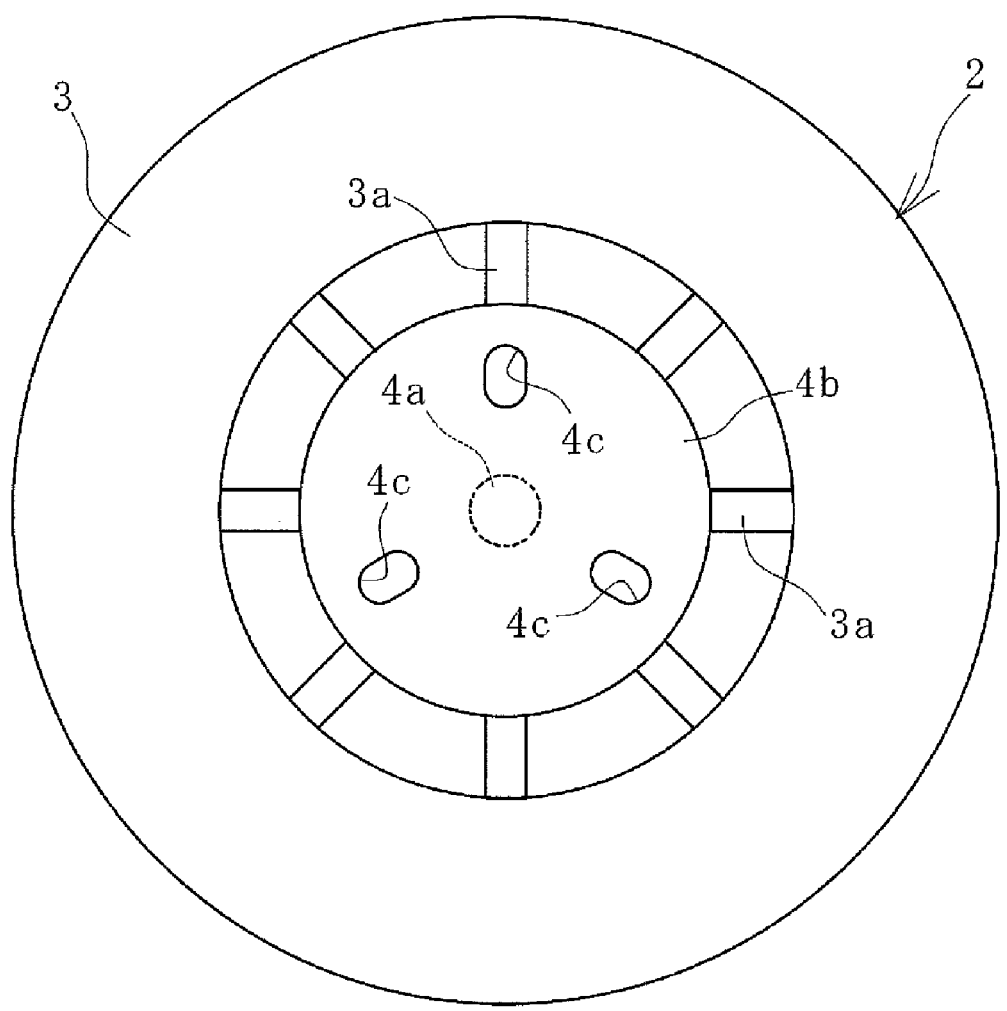
FIG. 4 is an explanatory diagram illustrating the forming drum body of FIG. 3 in a plan view.
Figure 5:
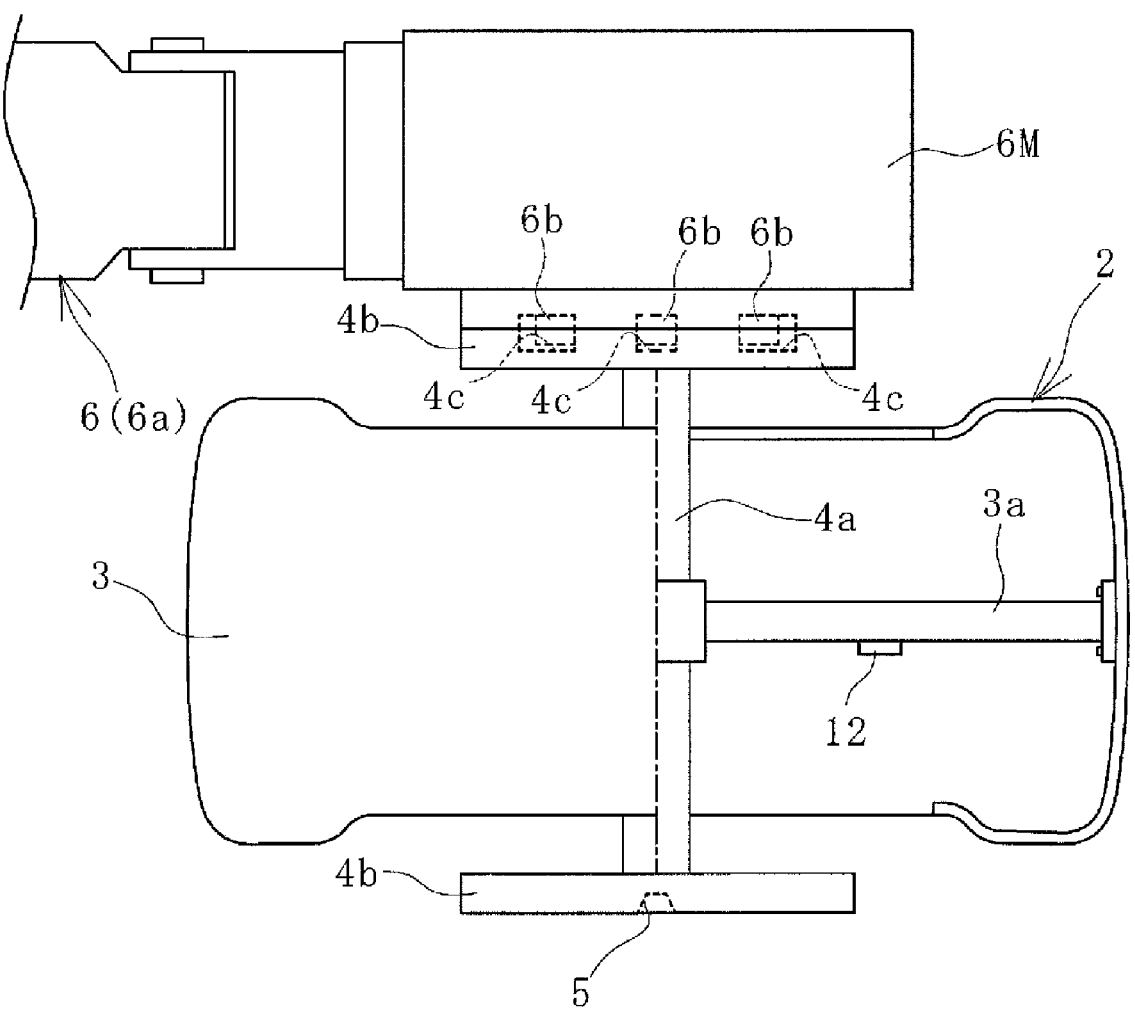
FIG. 5 is an explanatory diagram illustrating a state in which the gripping claw and the connecting portion of FIG. 3 are engaged with each other to hold the forming drum body by the robot arm.

The forming drum body 2 illustrated in FIGS. 3 to 5 includes a cylindrical portion 3 and a drum shaft 4a extending in a cylinder axial direction at a central portion of the cylindrical portion 3. Note that in FIGS. 3 and 5, the right half of the cylindrical portion 3 is shown in a longitudinal cross-sectional view. The cylindrical portion 3 is divided into a plurality of segments in a circumferential direction, and each segment is supported by a support shaft 3a extending radially from the drum shaft 4a. The cylindrical portion 3 is constituted by assembling the respective segments in an annular shape, and the cylindrical portion 3 is disassembled by releasing the assembly of the respective segments.

Disk portions 4b are fixed to both end portions of the drum shaft 4a, one of the disk portions 4b includes a connecting portion 4c on a surface, and the other of the disk portions 4b includes an engaging portion 5 on a surface. The connecting portion 4c is gripped by a gripping claw 6b of the robot arm 6 to be described below. The engaging portion 5 is engaged with a guide 9a formed on a placement base 9 of the placement device 8.

The robot arm 6 is controlled to perform a desired motion by the control device 14 based on teaching instruction contents input to the control device 14, a stored program, and the like. As the robot arm 6, various known types (so-called industrial robot arms) can be used. In the robot arm 6 of this embodiment, a drive motor 6M is attached to a tip of an arm portion 6a that is movable to a three-dimensional desired position, and a gripping claw 6b is provided via the drive motor 6M. The gripping claw 6b is attached to and detached from the connecting portion 4c of the forming drum body 2.

When the gripping claw 6b gripping the connecting portion 4c to hold the forming drum body 2 is rotationally driven by the drive motor 6M, the forming drum body 2 is rotationally driven around the drum shaft 4a together with the gripping claw 6b. By rotationally driving the forming drum body 2 held by the robot arm 6 in this way, the robot arm 6 can be used for a forming work.

In this embodiment, an identification portion 12 is attached to the forming drum body 2. Although the identification portion 12 is attached to the support shaft 3a supporting the cylindrical portion 3, it may also be attached to another position (for example, the cylindrical portion 3) of the forming drum body 2. The identification portion 12 has a function of distinguishing the forming drum body 2 to which the identification portion 12 is attached from the other forming drum bodies 2. An identification mark or a storage medium is used as the identification portion 12. The identification mark used as the identification portion 12 is a non-storage medium (having no function of storing information), and various known types such as various symbols, numbers, or combinations thereof, one dimensional codes, and two dimensional codes can be exemplified. As the storage medium used as the identification portion 12, various known types that can store information, such as an IC (integrated circuit) chip (IC tag), can be exemplified.

The placement device 8 is installed between the adjacent work stations S (a region between the work stations S), and can temporarily place the plurality of forming drum bodies 2. Since the placement device 8 only needs to be able to temporarily place the plurality of forming drum bodies 2, a plurality of placement devices 8 each of which can temporarily place one forming drum body 2 may be installed or one placement device 8 that can temporarily place a plurality of forming drum bodies 2 may be installed. Note that the placement device 8 installed between the adjacent work stations S means a placement device 8 that is installed within a range reached by the robot arm 6 installed in each of the adjacent work stations S and can be used using the robot arm 6.

In the embodiment illustrated in FIG. 1, two placement devices 8 each of which can temporarily place one forming drum body 2 are installed between the adjacent work stations S1 and S2. Similarly, two placement devices 8 each of which can temporarily place one forming drum body 2 are installed between the adjacent work stations S1 and S3, between the adjacent work stations S2 and S3, between the adjacent work stations S2 and S4, between the adjacent work stations S3 and S4, between the adjacent work stations S3 and S5, and between the adjacent work stations S4 and S5.

In this embodiment, one placement device 8 is present at an intersection of two-dot chain lines defining each of the three work stations S1, S2, and S3 adjacent to each other. The placement device 8 can be used by the robot arm 6 installed in each of the work stations S1, S2, and S3. Similarly, there is one placement device 8 that can be used by the robot arm 6 installed in each of the three work stations S2, S3, and S4 adjacent to each other, and there is one placement device 8 that can be used by the robot arm 6 installed in each of the three work stations S3, S4, and S5 adjacent to each other.

The forming drum body 2 is released from being held by the robot arm 6 and is placed on the placement device 8 in a sideways state. The forming drum body 2 placed and temporarily put on the placement device 8 is held by the robot arm 6 and moved to another place (the next work station S or the like).

Figure 6:
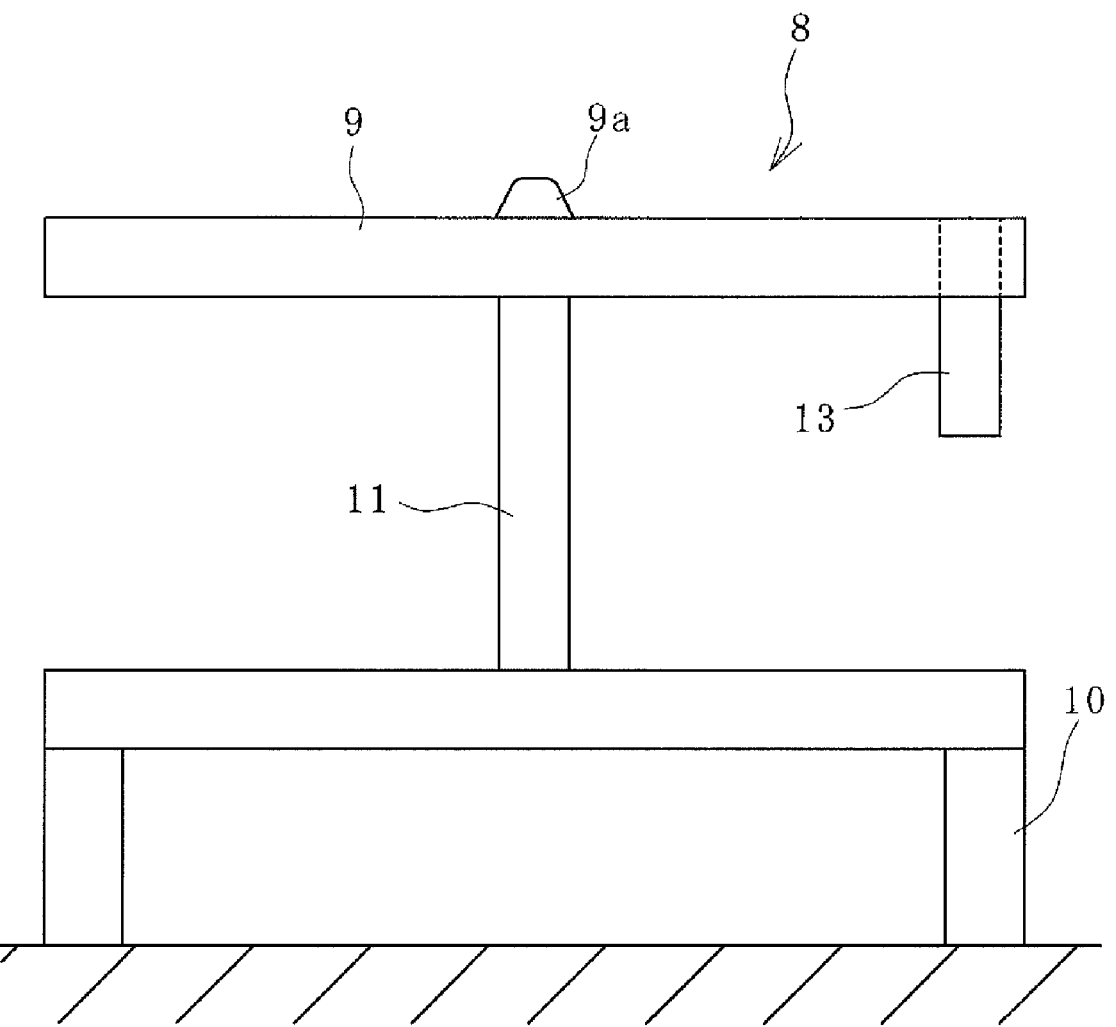
FIG. 6 is an explanatory diagram illustrating a placement device for the forming drum body in a side view.
Figure 7:
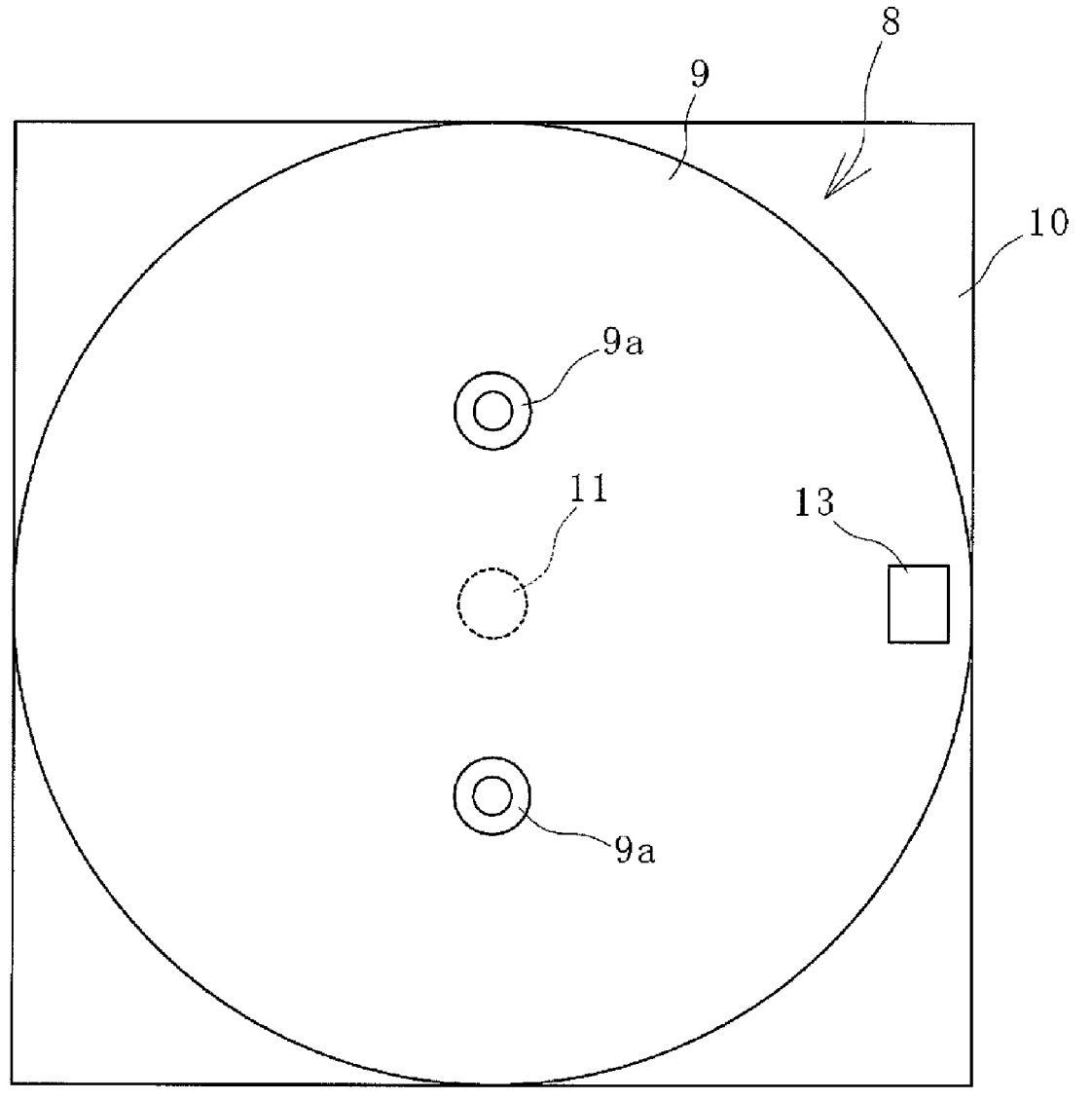
FIG. 7 is an explanatory diagram illustrating the placement device of FIG. 6 in a plan view.

As illustrated in FIGS. 6 and 7, the placement device 8 includes a placement base 9 and a base portion 10 disposed below the placement base 9. The placement base 9 is supported by a center shaft 11 erected on the base portion 10. The center shaft 11 is disposed at a center of the placement base 9 and the base portion 10 in a plan view.

The placement base 9 on which the forming drum body 2 is placed has a guide 9a. As the placement base 9, various shapes capable of placing the forming drum body 2 in a sideways state can be used. In this embodiment, a circular plate is used as the placement base 9. The guide 9a is an engaging body that engages with the forming drum body 2, and in this embodiment, the guides 9a having a truncated conical shape protrude upward on an upper surface of the placement base 9, and are disposed at two positions opposed to each other by 180° with the center shaft 11 interposed therebetween in a plan view. The number of the guides 9a is not particularly limited. For example, the guides can be disposed at three to four positions at equal intervals in a circumferential direction around the center shaft 11 in a plan view.

The base portion 10 is fixed to a predetermined installation position of a target region (such as a floor of the forming step) by a bolt or the like. The base portion 10 is not limited to the box-shaped frame body made of metal as in this embodiment, and for example, a simple metal plate may be used.

Figure 8:
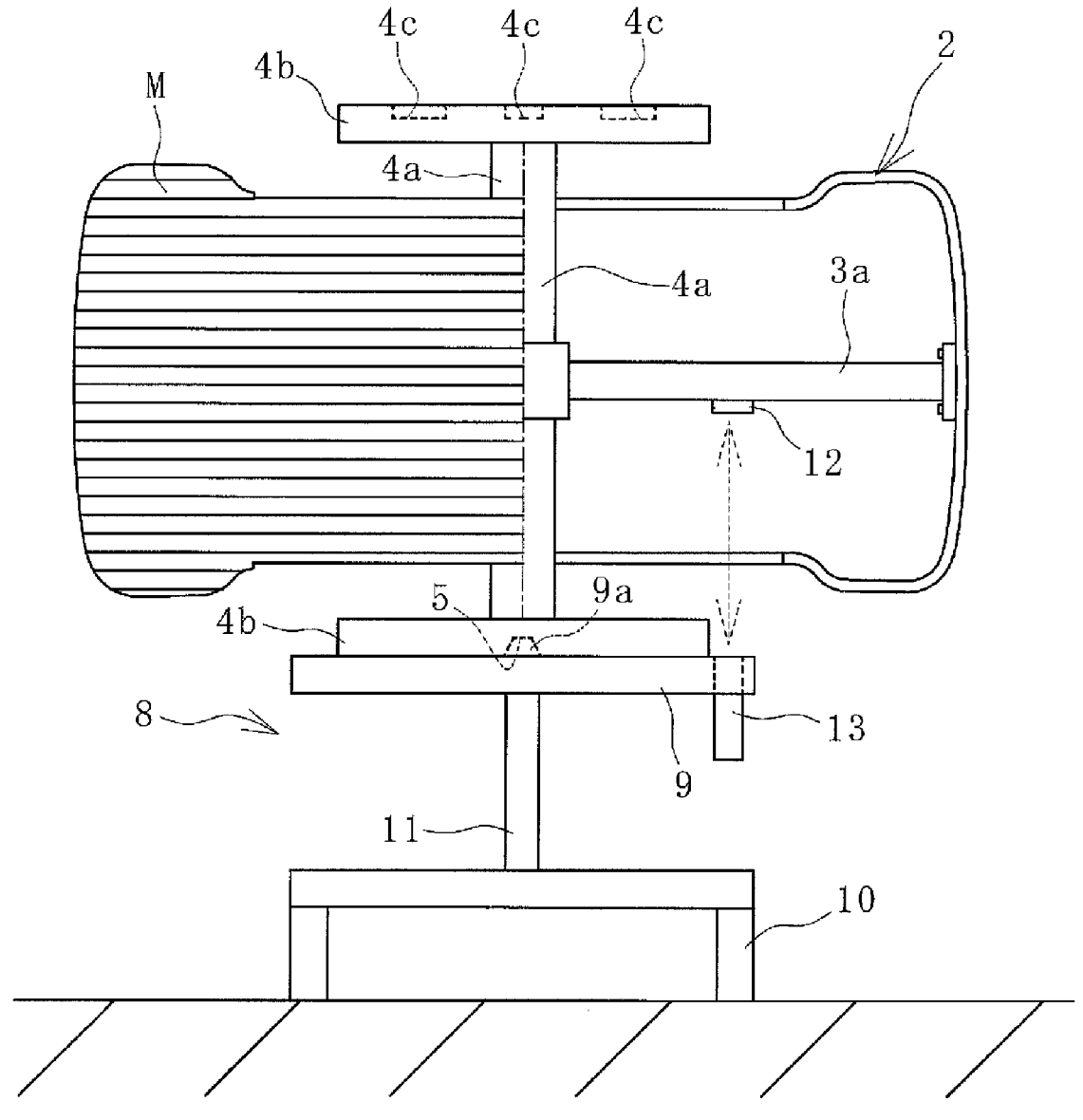
FIG. 8 is an explanatory diagram illustrating a state in which the forming drum body is temporarily placed on the placement device of FIG. 6.

In this embodiment, a detector 13 is attached to the placement device 8. Although the detector 13 is attached to the placement base 9, the detector may be attached to another position (for example, the base portion 10) of the placement device 8. As illustrated in FIG. 8, when the forming drum body 2 is temporarily placed on the placement device 8, the detector 13 detects the identification portion 12 attached to the temporarily placed forming drum body 2 in a non-contact manner and reads information displayed on or stored in the identification portion 12.

Figure 9:
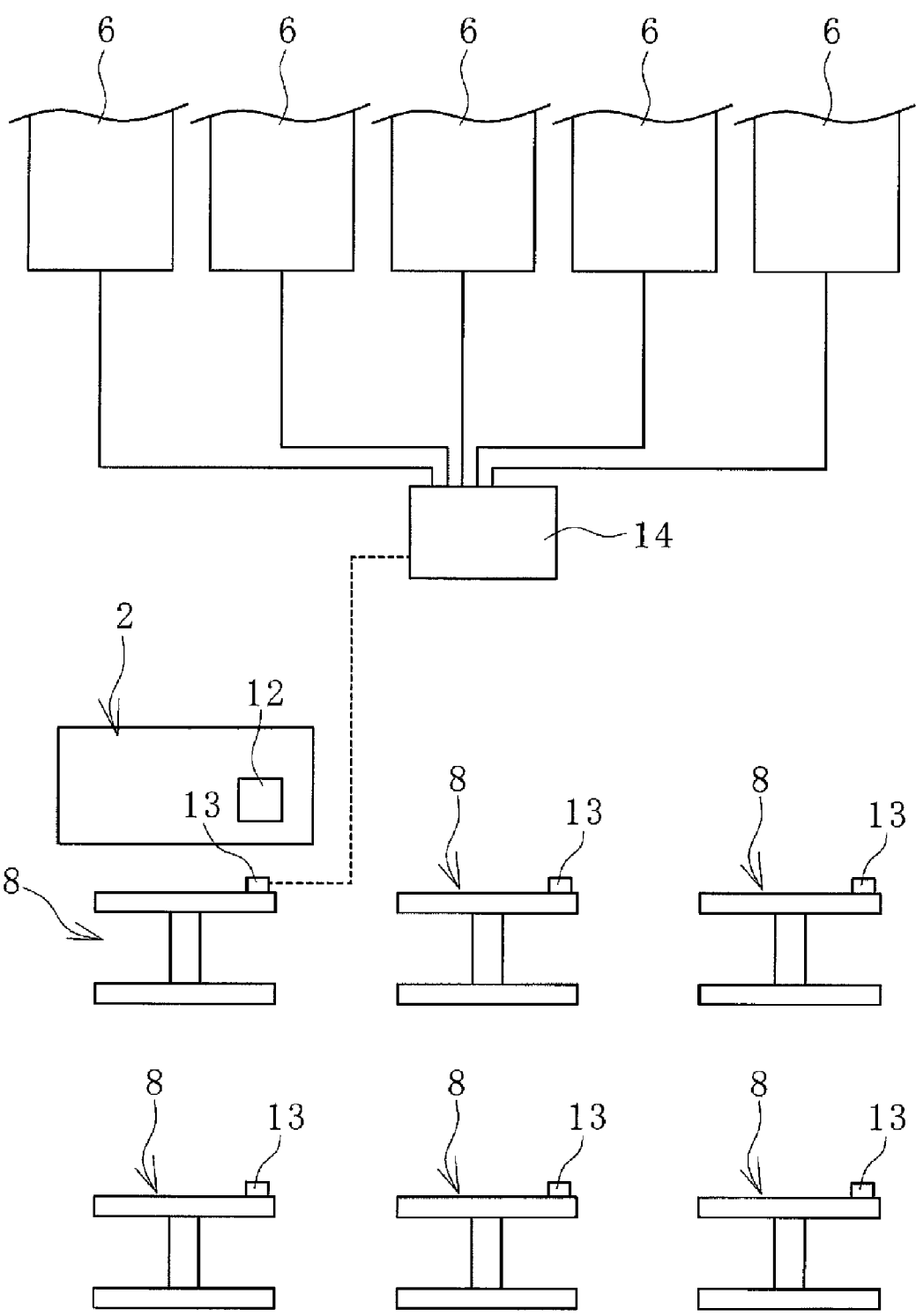
FIG. 9 is an explanatory diagram schematically illustrating a control aspect by a control device of FIG. 1.

As illustrated in FIG. 9, the detector 13 is connected to the control device 14 so as to be able to communicate with the control device 14 wirelessly or by wire. Detection data from the detector 13 is sequentially transmitted and input into the control device 14. The detector 13 can be of various known types corresponding to the identification portion 12.

The control device 14 receives and stores various data in addition to the data transmitted from the detector 13, and performs control of each robot arm 6 and various computational processing. Various computers can be used as the control device 14. The control device 14 also controls the respective member suppliers 7, but the member suppliers 7 can also be controlled by a control device separate from the control device 14.

The control device 14 selects a plurality of work stations S necessary for a forming work from all the work stations S (S1 to S5) formed in the forming step and determines a movement path of the forming drum body 2 in the forming step, in accordance with the specification of the green tire G to be formed. Then, the robot arm 6 disposed at a position corresponding to the determined movement path is controlled to deliver the forming drum body 2 through the placement device 8 disposed at the position corresponding to the movement path, thereby moving the forming drum body 2 along the determined movement path. Further, the control device 14 controls the robot arm 6 so that the forming work is performed in each of the selected work stations S. In this embodiment, the control device 14 controls the robot arm 6 disposed at a position corresponding to the movement path of the forming drum body 2 in response to the input detection data from the detector 13.

A plurality of necessary work stations S in accordance with the specification of the green tire G to be formed can also be selected based on a reference document or the like prepared in advance. The movement path of the forming drum body 2 in the forming step can also be determined based on a reference document or the like prepared in advance. In this case, an instruction specifying the selected work station S and the determined movement path is input to the control device 14 by a manual operation or the like.

A vulcanizing mold 16 corresponding to a tire specification is mounted on the vulcanization device 15, and the green tire G is vulcanized in the vulcanizing mold 16. Various known vulcanization devices 15 can be used. The number of the vulcanization devices 15 is appropriately set.

Next, an example of a procedure of manufacturing a tire using this manufacturing system 1 will be described. In this manufacturing system 1, a plurality of green tires G are continuously formed. That is, in the forming step, forming works of a plurality of green tires G are performed around the same time. The green tires G formed around the same time may all have the same specification, but the green tires G having different specifications may be mixed. For example, green tires G of two or three types of specifications may be formed around the same time in the forming step.

Figure 10A:
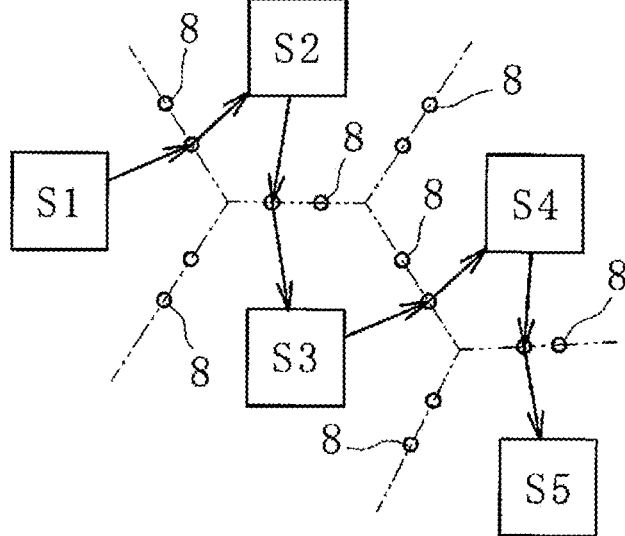
FIGS. 10A-10C are explanatory diagrams illustrating a movement path of the forming drum body.
Figure 10B:
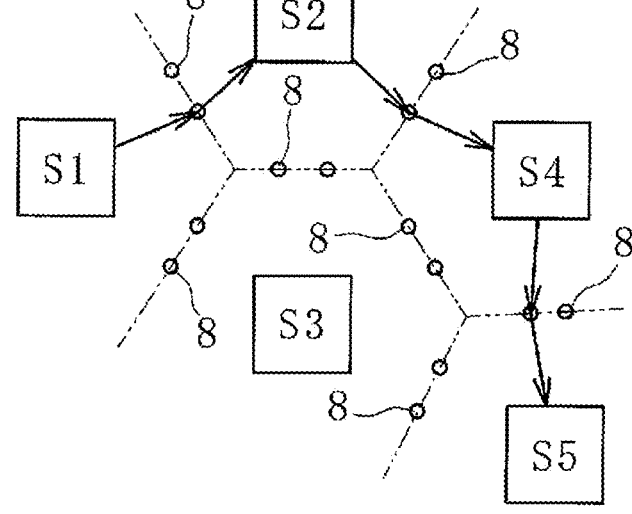
Figure 10C:
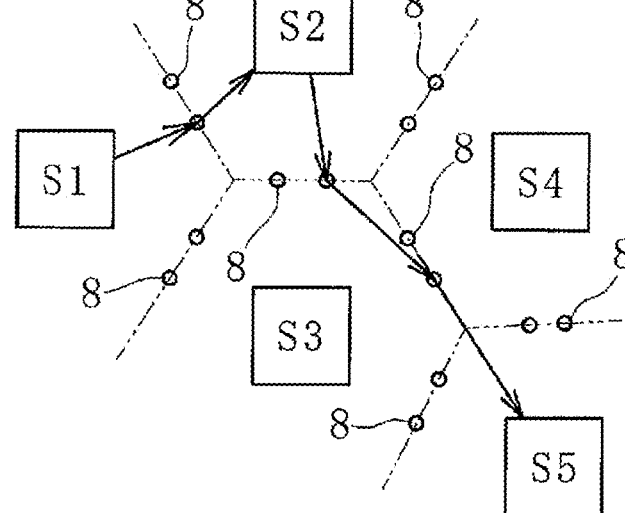

In the forming step illustrated in FIGS. 1 and 2, in accordance with the specification of the green tire G to be formed, a plurality of work stations S necessary for the forming work are selected from all the work stations S1 to S5, and the movement path of the forming drum body 2 in the forming step is determined as illustrated in FIGS. 10A-10C. In the case of the green tire G having an A specification, as illustrated in FIG. 10A, all the work stations S1 to S5 are selected, and it is determined that the forming drum body 2 is moved in the order of S1, S2, S3, S4, and S5 as the movement path using the placement devices 8 installed between the work stations. In the case of the green tire G having a B specification, as illustrated in FIG. 10B, the work stations S1, S2, S4, and S5 are selected, and it is determined that the forming drum body 2 is moved in the order of S1, S2, S4, and S5 as the movement path using the placement devices 8 installed between the work stations. In the case of the green tire G having a C specification, as illustrated in FIG. 10C, the work stations S1, S2, and S5 are selected, and it is determined that the forming drum body 2 is moved in the order of S1, S2, and S5 as the movement path using the placement devices 8 installed between the work stations.

In the selected work station S, the necessary tire component M is bonded to the forming drum body 2 using the robot arm 6 installed in each of the work stations S. That is, as illustrated in FIG. 5, the forming drum body 2 is mounted on the robot arm 6, the forming drum body 2 is brought into a desired state (position and angle) with respect to the member supplier 7 while being rotationally driven, and the tire component M supplied from the member supplier 7 is bonded toward the forming drum body 2.

When the forming work in each of the work stations S is completed, in order to move the forming drum body 2 to the next work station S2, the robot arm 6 moves the held forming drum body 2 above a predetermined placement device 8 as illustrated in FIG. 5, and then releases the holding of the forming drum body 2. Accordingly, as illustrated in FIG. 8, the engaging portion 5 of the forming drum body 2 and the guide 9a of the placement portion 2 are engaged with each other, and the forming drum body 2 is temporarily placed on the placement base 9 in a sideways state. The drum shaft 4a is positioned directly above the center shaft 11. In order to move the forming drum body 2 temporarily placed on the placement device 8 to the next work station S2, the forming drum body 2 is mounted on a predetermined robot arm 6, lifted up from the placement device 8, and moved.

In order to move the forming drum body 2, the robot arm 6 disposed at a position corresponding to the determined movement path is used to deliver the forming drum body 2 through the placement device 8 disposed at a position corresponding to the movement path, thereby moving the forming drum body 2 along the movement path. In the cases of FIGS. 10A and 10B, since the forming drum body 2 is sequentially subjected to the forming work in the adjacent work stations S and moved, the forming drum body 2 is moved using the robot arm 6 installed in the work station S for performing the forming work.

In this embodiment, when the forming drum body 2 is temporarily placed on each placement device 8, the detector 13 provided in the placement device 8 detects the identification portion 12 attached to the temporarily placed forming drum body 2. Detection data from the detector 13 is input to the control device 14, and the control device 14 controls the robot arm 6 disposed at a position corresponding to the input movement path of the forming drum body 2 in response to the detection data.

Specifically, when using an identification mark as the identification portion 12, each identification mark and the specification of the green tire G formed using the forming drum body 2 to which the identification mark is attached are stored in the control device 14 in association with each other. When using a storage medium capable of storing information as the identification portion 12, the specification of the green tire G formed using the forming drum body 2 to which the storage medium is attached is stored in the storage medium.

Then, the control device 14 to which the detection data from the detector 13 is input grasps a position of the forming drum body 2 to which the identification portion 12 for which the detection data is detected is attached, and collates the position with the movement path of the forming drum body 2. Next, the robot arm 6 disposed at a position corresponding to the subsequent movement path of the forming drum body 2 is controlled to be operated to move the forming drum body 2, and when the robot arm 6 performs the forming work, the robot arm 6 is controlled to perform the forming operation, and then the robot arm 6 is controlled to place the forming drum body 2 on a predetermined placement device 8. When the robot arm 6 performs only the movement of the forming drum body 2, the control device 14 performs control so that the forming drum body 2 is placed on a predetermined placement device 8.

When an identification mark is used as the identification portion 12, there is an advantage that the risk of being damaged in the vulcanization step is reduced, and it is also advantageous in reducing the cost. When a storage medium is used as the identification portion 12, various additional information can be stored, and the information stored in the storage medium can be grasped using a reader without using the control device 14.

In the forming step, a plurality of forming drum bodies 2 can be temporarily placed on the placement device 8 between adjacent work stations S, and there are at least three work stations S adjacent to each other. Since the placement device 8 has a function of temporarily placing the forming drum body 2 and a function as a branch point of the movement path of the forming drum body 2, when mixing and forming green tires G having different specifications around the same time, more various movement paths can be set in accordance with the specifications of the green tire G to be formed. That is, when forming the green tires G having different times required for the forming work around the same time, it is possible to increase options for the movement paths for forming the respective green tires G in as short a time as possible. Along with this, the green tires G can be formed by moving the forming drum bodies 2 to the necessary work stations S in sequence flexibly and smoothly. Further, since the robot arm 6 is used for performing the forming work and moving the forming drum body 2, the green tires G having various specifications can be efficiently and easily formed as compared with a case where the robot arm 6 is used only for moving the forming drum body 2.

By allowing the plurality of forming drum bodies 2 to be temporarily placed on the placement device 8 between the adjacent work stations S, at least one forming drum body 2 is not simply temporarily placed on the placement device 8 between the adjacent work stations S, but the movement can be suspended in accordance with the progress of the forming work in the work station S of the movement destination. That is, the placement device 8 can be allowed to function as a buffer. Therefore, even when all the green tires G to be formed around the same time have the same specification or when the green tires G having different specifications are mixed, it is advantageous in moving the forming drum body 2 in sequence more flexibly and smoothly in accordance with the progress of the forming work in the work station S of the movement destination.

In the case of FIG. 10C, the forming drum body 2 is sequentially subjected to the forming work in the work stations S2 and S5 not adjacent to each other and moved. However, the forming drum body 2 cannot be moved from the work station S2 to the work station S5 only by the robot arms 6 installed in the work stations S2 and S5. Therefore, the robot arm 6 installed in the work station S3 or S4 is used as the robot arm 6 disposed at a position corresponding to the movement path. In addition, as the placement device 8 installed at a position corresponding to the movement path, the placement device 8 installed between the work stations S3 and S4 is used.

That is, the robot arm 6 installed in the work station S3 or S4 is not used for the forming work but only for moving the forming drum body 2. Whether the robot arm 6 installed in the work station S3 or S4 is used is determined so that the robot arm 6 not used for the other green tire G at that time is used. As described above, the robot arm 6 is used not only for both the forming work and the movement of the forming drum body 2 but also only for the movement of the forming drum body 2 in accordance with the specification of the green tire G, which is advantageous in moving the forming drum body 2 in sequence more flexibly and smoothly.

As illustrated in FIG. 1, when there is a placement device 8 that can be used in common by the robot arms 6 installed in three or more work stations S adjacent to each other, the forming drum body 2 temporarily placed on the placement device 8 can be directly moved to the work station S using the robot arm 6 installed in each of the work stations S adjacent to each other. Therefore, it is advantageous in moving the forming drum body 2 more quickly to the necessary work station S.

As described above, by sequentially moving the forming drum body 2 to the necessary work station S, the green tire G is formed on the outer peripheral surface of the forming drum body 2 by the necessary tire component M. The green tire G that has been formed is moved to the vulcanization step together with the forming drum body 2.

Figure 11:
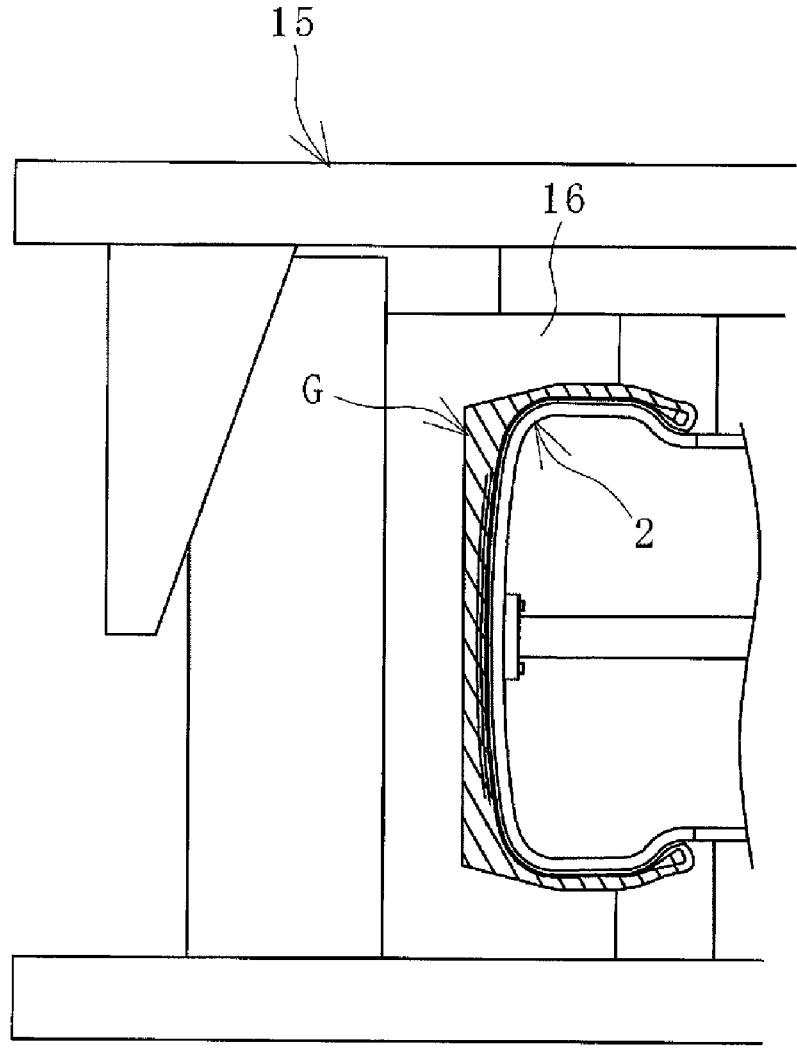
FIG. 11 is an enlarged explanatory diagram illustrating a part of a vulcanization device vulcanizing a green tire in a longitudinal cross-sectional view.

In the vulcanization step illustrated in FIG. 11, the green tire G that has been formed is vulcanized by a known method. The green tire G is disposed together with the forming drum body 2 in the vulcanizing mold 16 mounted on the vulcanization device 15. Then, the green tire G is vulcanized in the closed vulcanization mold 16, so that the tire T is completed. In this embodiment, the pneumatic tire is manufactured. However, the present technology is not limited to the pneumatic tire and can be applied when manufacturing other various types of tires T.

As described above, the forming work is performed while the forming drum body 2 is moved to the necessary work stations S in sequence flexibly and smoothly, so that the green tire G having various specifications can be efficiently and easily formed. As a result, it is advantageous in manufacturing the tires T having various specifications with high productivity.

The invention claimed is:

1. A method of manufacturing a tire, the method comprising:

sequentially moving a forming drum body to a plurality of work stations in a forming step;

forming a green tire by performing a forming work of bonding a tire component to the forming drum body by using a robot arm installed in each of the work stations; and vulcanizing the green tire;

the method further comprising:

installing one or a plurality of robot arms in each of the work stations;

allowing a plurality of the forming drum bodies to be temporarily placed on a placement device between the work stations adjacent to each other and providing at least three of the work stations adjacent to each other in the forming step;

selecting, in accordance with a specification of the green tire to be formed, a plurality of the work stations necessary for the forming work from all the work stations and determining a movement path of the forming drum body in the forming step;

using the robot arm disposed at a position corresponding to the movement path determined and placing the forming drum body on the placement device disposed at a position corresponding to the movement path to deliver the forming drum body, thereby moving the forming drum body along the movement path; and performing the forming work in each of the work stations selected; wherein all placement devices included in the method, including the placement device, are fixed to a predetermined installation position.

2. The method of manufacturing a tire according to claim 1, wherein a plurality of types of green tires having different specifications are mixed and formed around the same time in the forming step.

3. The method of manufacturing a tire according to claim 1, comprising attaching an identification portion to each of the forming drum bodies, providing a detector configured to detect the identification portion in each of a plurality of placement devices, causing, when the forming drum body is temporarily placed on each of the placement devices, the detector provided in each placement device to detect the identification portion attached to the forming drum body temporarily placed and to input detection data from the detector into a control device and causing the control device to control the robot arm disposed at a position corresponding to the movement path of the forming drum body in response to the input detection data.

4. The method of manufacturing a tire according to claim 3, wherein an identification mark or a storage medium capable of storing information is used as the identification portion.

5. A system for manufacturing a tire, the system comprising:

a plurality of work stations formed in a forming step;

a forming drum body configured to sequentially move to the work stations;

a robot arm installed in each of the work stations; and a vulcanization device and having a configuration in which a green tire is formed by performing a forming work of bonding a tire component to the forming drum body by using the robot arm installed in each of the work stations and in which the green tire is vulcanized by the vulcanization device;

the system further comprising:

one or a plurality of robot arms being installed in each of the work stations;

a placement device installed between the work stations adjacent to each other; and a control device configured to control each of the robot arms, all placement devices included in the system, including the placement device, being fixed to a predetermined installation position, a plurality of the forming drum bodies being allowed to be temporarily placed between the work stations adjacent to each other, and at least three of the work stations adjacent to each other being provided in the forming step, in accordance with a specification of the green tire to be formed, a plurality of the work stations necessary for the forming work being selected from all the work stations by the control device, and a movement path of the forming drum body in the forming step being determined by the control device, and the robot arm disposed at a position corresponding to the movement path determined being controlled by the control device, the forming drum body being placed on the placement device disposed at a position corresponding to the movement path to deliver the forming drum body, thereby the forming drum body being moved along the movement path, and the forming work being performed in each of the selected work stations.

6. The method of manufacturing a tire according to claim 2, comprising attaching an identification portion to each of the forming drum bodies, providing a detector configured to detect the identification portion in each of a plurality of placement devices, causing, when the forming drum body is temporarily placed on each of the placement devices, the detector provided in each placement device to detect the identification portion attached to the forming drum body temporarily placed and to input detection data from the detector into a control device and causing the control device to control the robot arm disposed at a position corresponding to the movement path of the forming drum body in response to the input detection data.

7. The method of manufacturing a tire according to claim 6, wherein an identification mark or a storage medium capable of storing information is used as the identification portion.

8. The method of manufacturing a tire according to claim 1, wherein a plurality of the forming drum bodies are temporarily placeable on the placement device between all work stations adjacent to each other.

9. The method of manufacturing a tire according to claim 1, wherein a same one placement device that can be used by the robot arm installed in each of three of the work stations is provided between three of the work stations adjacent in a three-cornered arrangement.

10. The system for manufacturing a tire according to claim 5, wherein a same one placement device that can be used by the robot arm installed in each of three of the work stations is provided between three of the work stations adjacent in a three-cornered arrangement.

* * * * *